United States Patent
Shao et al.

(10) Patent No.: US 10,212,016 B2
(45) Date of Patent: Feb. 19, 2019

(54) SYNCHRONIZATION METHOD AND APPARATUS ON THE BASIS OF A FIELD BROADBAND BUS ARCHITECTURE OF INDUSTRIAL INTERNET

(71) Applicant: KYLAND TECHNOLOGY CO., LTD, Beijing (CN)

(72) Inventors: Zhihui Shao, Beijing (CN); Jing Shi, Beijing (CN); Hui Zhong, Beijing (CN); Yi Huang, Beijing (CN)

(73) Assignee: KYLAND TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 15/858,984

(22) Filed: Dec. 29, 2017

(65) Prior Publication Data
US 2019/0013986 A1     Jan. 10, 2019

(30) Foreign Application Priority Data
Jul. 5, 2017     (CN) .......................... 2017 1 0543469

(51) Int. Cl.
*H04L 27/26* (2006.01)
*H04L 12/40* (2006.01)
*G06F 13/42* (2006.01)

(52) U.S. Cl.
CPC ...... *H04L 27/2657* (2013.01); *G06F 13/4291* (2013.01); *H04L 12/40013* (2013.01); *H04L 12/40123* (2013.01); *H04L 2012/40215* (2013.01); *H04L 2012/40221* (2013.01)

(58) Field of Classification Search
CPC .......... H04L 27/2657; H04L 12/40123; H04L 12/40013; H04L 2012/40215; H04L 2012/40221; G06F 13/4291
USPC ................. 375/354, 355, 356, 364, 365, 366
See application file for complete search history.

(56) References Cited

U.S. PATENT DOCUMENTS

| | | | |
|---|---|---|---|
| 6,363,128 B1 | 3/2002 | Isaksson et al. | |
| 7,433,435 B2 * | 10/2008 | Nagaraja | H04L 27/2662 375/354 |
| 8,804,804 B1 * | 8/2014 | Sarris | H04L 27/2657 375/229 |
| 2002/0126706 A1 | 9/2002 | Laroia et al. | |
| 2007/0286062 A1 * | 12/2007 | Gupta | H04L 27/261 370/203 |
| 2009/0279421 A1 * | 11/2009 | Wang | H04L 27/2662 370/210 |

* cited by examiner

*Primary Examiner* — Siu M Lee

(57) ABSTRACT

Embodiments of the disclosure disclose a synchronization method and apparatus on the basis of a field broadband bus architecture of an industrial Internet, where the bus architecture includes a bus controller, at least one bus terminal, and a two-wire bus, and the bus controller and the bus terminal are connected over the two-wire bus to constitute a bus system, the bus system communicating using OFDM technology; and in the method, all the bus terminals refer to the bus controller, and when receiving a signal, and transmitting a signal, they adjust a clock for a received signal, and a signal to be transmitted, adaptively according to the downlink pilot signal so as to synchronize their clocks and symbols with the bus controller, and adjust a transmission time for the signal to be transmitted so that all the devices in the bus system are synchronized.

22 Claims, 6 Drawing Sheets

SYNCHRONIZATION METHOD AND APPARATUS ON THE BASIS OF A FIELD BROADBAND BUS ARCHITECTURE OF INDUSTRIAL INTERNET

CROSS-REFERENCES TO RELATED APPLICATION

This application claims priority to Chinese patent application No. 201710543469.3, filed on Jul. 5, 2017, which is incorporated herein by reference in their entirety.

FIELD

The present disclosure relates to the field of communications, and particularly to a synchronization method and apparatus on the basis of a field broadband bus architecture of an industrial Internet.

BACKGROUND

In the prior art of communication, underlying data communication in the field of automatization is generally conducted on a field bus. The so-called field bus refers to a digital, serial, and multi-point communication data bus between a field device installed in a manufacturing or process area, and an automatic device controlling the indoor device. The field bus generally includes a Controller Area Network (CAN) bus and a Process Field Bus (PROFIBUS).

However the transmission bandwidth of the CAN bus and the PROFIBUS is low, typically below 50 MHz, thus resulting in such a low transmission rate that fails to satisfy access and high-speed transmission demands of a large number of industrial field devices in a large industrial field.

Although there are higher transmission bandwidths of Profinet and other industrial Ethernet buses than the CAN bus and the PROFIBUS, a field device needs to access, and transmit data, through an Ethernet switch in an application of the Profinet and the other industrial Ethernet buses to an industrial field, thus making the system complicated, making it difficult to deploy wires, and failing to accommodate high-speed and real-time transmission of data. Moreover as there is a growing scale of the industrial field, there are also an increasing number of industrial field devices to be attached over the field bus, but the Profinet also fails to satisfy the access and high-speed transmission demands of a large number of industrial field devices in the large industrial field. Since the field devices need to access, and transmit data, through an Ethernet switch, the synchronization solution to the Profinet and the other industrial Ethernet buses may be complicated and have a poor effect.

As there is a growing scale of the industrial field, there are an increasing number of industrial field devices, so there is absent in the prior art a highly real-time, high-bandwidth, and high-speed field bus without any switch.

SUMMARY

Embodiments of the disclosure provide a synchronization method and apparatus on the basis of a field broadband bus architecture of an industrial internet so as to make the entire bus system to achieve synchronization, and the synchronization solution used is easy to deploy, system is synchronized accurately and reliably, to thereby provide an underlying guarantee for transmission of a hard real-time service.

Specific technical solutions according to the embodiments of the disclosure are as follows.

In a first aspect, an embodiment of the disclosure provides a synchronization method on the basis of a field broadband bus architecture of an industrial Internet, wherein the field broadband bus architecture of an industrial Internet includes: a bus controller, at least one bus terminal, and a two-wire bus, and the bus controller and the at least one bus terminal are connected over the two-wire bus to constitute a bus system; the bus controller communicates with any of the at least one bus terminal, and the bus terminal communicates with each other, using the Orthogonal Frequency Division Multiplexing (OFDM) technology, and sub-carriers occupied by the bus terminal do not interfere with each other; and the synchronization method applicable to each one bus terminal includes:

receiving, by the bus terminal, a downlink pilot signal transmitted by the bus controller in a downlink system subframe, and determining a clock offset and a symbol offset respectively between the bus terminal and the bus controller based upon the received downlink pilot signal;

correcting, by the bus terminal, a clock for a received signal based upon the clock offset, and correcting a clock for a signal to be transmitted based upon the clock offset; and adjusting a window position of the received signal based upon the symbol offset, and adjusting a window position of the signal to be transmitted based upon the symbol offset, so that the bus terminal is clock-synchronized and symbol-synchronized with the bus controller; and adjusting, by the bus terminal, a transmission time of a signal to be transmitted to the bus controller, according to a transmission delay between the bus terminal and the bus controller, and adjusting transmission time of signals to be transmitted to the other bus terminals, according to transmission delays between the bus terminal and the other bus terminals, so that the bus system is synchronized by clock-synchronization and symbol-synchronization of each bus terminal with the bus controller and adjusting the transmission delay between each bus terminal and the bus controller.

Preferably determining the clock offset and the symbol offset respectively between the bus terminal and the bus controller based upon the received downlink pilot signal includes:

when the bus system is being initialized, upon each reception of the downlink pilot signals in the current downlink system subframe, determining, by the bus terminal, the clock offset and the symbol offset respectively between the bus terminal and the bus controller according to two downlink pilot signals received in the current downlink system subframe; or when the bus system is operating stably, upon each reception of the downlink pilot signal in the current downlink system subframe, determining, by the bus terminal, the clock offset respectively between the bus terminal and the bus controller according to a downlink pilot signal received in the current downlink system subframe, and a downlink pilot signal received in the last downlink system subframe, and every preset number of signal frames, determining the symbol offset between the bus terminal and the bus controller according to the downlink pilot signal received in the current downlink system subframe, and the downlink pilot signal received in the last downlink system subframe.

Preferably after the bus terminal corrects the clock for the received signal based upon the clock offset, corrects the clock for the signal to be transmitted based upon the clock offset, adjusts the window position of the received signal based upon the symbol offset and adjusts the window position of the signal to be transmitted based upon the symbol offset, and before the bus terminal adjusts the transmission time of the signal to be transmitted to the bus controller, according to the transmission delay between the bus terminal and the bus controller returned by the bus controller, the method further includes:

determining, by the bus terminal, that the bus terminal is clock-synchronized successfully with the bus controller, and the bus terminal is symbol-synchronized successfully with the bus controller, upon determining that system broadcast information transmitted by the bus controller in a downlink subframe is received correctly.

Preferably after it is determined that the bus terminal is clock-synchronized successfully with the bus controller, and the bus terminal is symbol-synchronized successfully with the bus controller, and before the bus terminal adjusts the transmission time of the signal to be transmitted to the bus controller, according to the transmission delay between the bus terminal and the bus controller, the method further includes:

when the bus terminal is a bus terminal initially accessing the bus controller, transmitting an access request message to the bus controller in an uplink subframe in a normal frame, to trigger the bus controller to return an access acknowledgement message to the bus terminal in response to the access request message, wherein the access acknowledge message carries the transmission delay between the bus terminal and the bus controller, and receiving the access acknowledgement message transmitted by the bus controller in a downlink subframe, wherein the normal frame is a signal frame including the downlink system subframe, the downlink subframe, and the uplink subframe; or when the bus terminal is a bus terminal accessing randomly the bus controller, transmitting an access request message to the bus controller in a random access system subframe in a special frame, to trigger the bus controller to return an access acknowledgement message to the bus terminal in response to the access request message, wherein the access request message carries the transmission delay between the bus terminal and the bus controller, and receiving the access acknowledgement message transmitted by the bus controller in a downlink subframe, wherein the special frame is a signal frame including the downlink system subframe, the downlink subframe, an uplink subframe, and the random access system subframe.

Preferably triggering the bus controller to return the access acknowledgement message to the bus terminal in response to the access request message, the access acknowledge message carrying the transmission delay between the bus terminal and the bus controller includes:

triggering the bus controller:
- to obtain a reception time of the access request message, and to obtain transmission time corresponding to a specified number of OFDM symbols in the uplink subframe;
- to determine the transmission time corresponding to the OFDM symbol, which is earlier than the reception time and has a minimum difference with the reception time, as a transmission time of the access request message; and
- to determine the transmission delay between the bus terminal and the bus controller according to the difference between the reception time of the access request message, and the transmission time of the access request message, and to transmit the access acknowledgement message carrying the transmission delay between the bus terminal and the bus controller to the bus terminal.

Preferably the downlink system subframe is the first subframe in each signal frame which is a special frame or a normal frame.

In a second aspect, an embodiment of the disclosure provides a synchronization apparatus on the basis of a field broadband bus architecture of an industrial Internet, wherein the field broadband bus architecture of an industrial Internet includes: a bus controller, at least one bus terminal, and a two-wire bus, and the bus controller and the at least one bus terminal are connected over the two-wire bus to constitute a bus system, wherein the bus controller communicates with any of the at least one bus terminal, and the bus terminal communicates with each other, using the Orthogonal Frequency Division Multiplexing (OFDM) technology, and sub-carriers occupied by the bus terminal do not interfere with each other; and the synchronization apparatus applicable to each bus terminal includes:

a determining unit configured to receive a downlink pilot signal transmitted by the bus controller in a downlink system subframe, and to determine a clock offset and a symbol offset respectively between the bus terminal and the bus controller based upon the received downlink pilot signal;

an adjusting unit configured to correct a clock for a received signal based upon the clock offset, and to correct a clock for a signal to be transmitted based upon the clock offset; and to adjust a window position of the received signal based upon the symbol offset, and to adjust a window position of the signal to be transmitted based upon the symbol offset, so that the bus terminal is clock-synchronized and symbol-synchronized with the bus controller; and a synchronizing unit configured to adjust a transmission time of a signal to be transmitted to the bus controller, according to a transmission delay between the bus terminal and the bus controller, and to adjust transmission time of signals to be transmitted to the other bus terminals, according to transmission delays between the bus terminal and the other bus terminals, so that the bus system is synchronized by clock-synchronization and symbol-synchronization of each bus terminal with the bus controller and adjusting the transmission delay between each bus terminal and the bus controller.

Preferably the determining unit configured to determine the clock offset and the symbol offset respectively between the bus terminal and the bus controller based upon the received downlink pilot signal is configured:

when the bus system is being initialized, upon each reception of the downlink pilot signals in the current downlink system subframe, to determine the clock offset and the symbol offset respectively between the bus terminal and the bus controller according to two downlink pilot signals received in the current downlink system subframe; or when the bus system is operating stably, upon each reception of the downlink pilot signal in the current downlink system subframe, to determine the clock offset respectively between the bus terminal and the bus controller according to a downlink pilot signal received in the current downlink system subframe, and a downlink pilot signal received in the last downlink system subframe, and every preset number of signal frames, to determine the symbol offset between the bus terminal and the bus controller according to the downlink pilot signal received in the current downlink system subframe, and the downlink pilot signal received in the last downlink system subframe.

Preferably after the bus terminal corrects the clock for the received signal based upon the clock offset, corrects the clock for the signal to be transmitted based upon the clock offset, adjusts the window position of the received signal based upon the symbol offset and adjusts the window position of the signal to be transmitted based upon the symbol offset, and before the bus terminal adjusts the transmission time of the signal to be transmitted to the bus controller, according to the transmission delay between the bus terminal and the bus controller returned by the bus controller, the adjusting unit is further configured:

for the bus terminal to determine that the bus terminal is clock-synchronized successfully with the bus controller, and the bus terminal is symbol-synchronized successfully with the bus controller, upon determining that system broadcast information transmitted by the bus controller in a downlink subframe is received correctly.

Preferably after it is determined that the bus terminal is clock-synchronized successfully with the bus controller, and the bus terminal is symbol-synchronized successfully with the bus controller, and before the bus terminal adjusts the transmission time of the signal to be transmitted to the bus controller, according to the transmission delay between the bus terminal and the bus controller, the adjusting unit is further configured:

when the bus terminal is a bus terminal initially accessing the bus controller, to transmit an access request message to the bus controller in an uplink subframe in a normal frame, to trigger the bus controller to return an access acknowledgement message to the bus terminal in response to the access request message, wherein the access acknowledge message carries the transmission delay between the bus terminal and the bus controller, and to receive the access acknowledgement message transmitted by the bus controller in a downlink subframe, wherein the normal frame is a signal frame including the downlink system subframe, the downlink subframe, and the uplink subframe; or when the bus terminal is a bus terminal accessing randomly the bus controller, to transmit an access request message to the bus controller in a random access system subframe in a special frame, to trigger the bus controller to return an access acknowledgement message to the bus terminal in response to the access request message, wherein the access acknowledge message carries the transmission delay between the bus terminal and the bus controller, and to receive the access acknowledgement message transmitted by the bus controller in a downlink subframe, wherein the special frame is a signal frame including the downlink system subframe, the downlink subframe, an uplink subframe, and the random access system subframe.

Preferably the adjusting unit configured to trigger the bus controller to return the access acknowledgement message to the bus terminal in response to the access request message, the access acknowledge message carrying the transmission delay between the bus terminal and the bus controller is further configured:

to trigger the bus controller:
  to obtain a reception time of the access request message, and to obtain transmission time corresponding to a specified number of OFDM symbols in the uplink subframe;
  to determine the transmission time corresponding to the OFDM symbol, which is earlier than the reception time and has a minimum difference with the reception time, as a transmission time of the access request message; and
  to determine the transmission delay between the bus terminal and the bus controller according to the difference between the reception time of the access request message, and the transmission time of the access request message, and to transmit the access acknowledgement message carrying the transmission delay between the bus terminal and the bus controller to the bus terminal.

Preferably the downlink system subframe is the first subframe in each signal frame which is a special frame or a normal frame.

In a third aspect, an embodiment of the disclosure provides an electronic device including:
  one or more processor; and
  one or more computer readable mediums on which program for synchronization on the basis of a field broadband bus architecture of an industrial Internet is stored, wherein the program performs the method according to any one of the embodiments in the first aspect above.

In a fourth aspect, an embodiment of the disclosure provides one or more computer readable mediums on which program for synchronization on the basis of a field broadband bus architecture of an industrial Internet is stored, wherein the program performs the method according to any one of the embodiments in the first aspect above.

In a fifth aspect, an embodiment of the disclosure provides a synchronization method on the basis of a field broadband bus architecture of an industrial Internet, wherein the bus architecture includes a bus controller and at least one bus terminal, and the bus terminal communicating with each other using the multi-carrier OFDM technology includes:
  receiving, by a bus terminal, a downlink pilot signal transmitted by the bus controller in a downlink system subframe;
  determining, by the bus terminal, a clock offset and a symbol offset respectively between the bus terminal and the bus controller based upon the received downlink pilot signal, wherein the clock offset is used for correcting a clock for a signal to be transmitted, and the symbol offset is used for adjusting a window position of the signal to be transmitted; and
  obtaining, by the bus terminal, a locally stored transmission delay, and correspondingly adjusting the signal to be transmitted, based upon the clock offset, the symbol offset, and the transmission delay, wherein the transmission delay includes a delay between the bus terminal and the bus controller, and delays between the bus terminals.

Preferably correspondingly adjusting the signal to be transmitted, based upon the clock offset, the symbol offset, and the transmission delay includes:
  correcting, by the bus terminal, the clock for the received signal based upon the clock offset, and correcting the clock for the signal to be transmitted based upon the clock offset; and adjusting the window position of the received signal based upon the symbol offset, and adjusting adjust the window position of the signal to be transmitted based upon the symbol offset, so that the clock and the bus terminal is clock-synchronized and symbol-synchronized with the bus controller; and
  adjusting, by the bus terminal, a transmission time of a signal to be transmitted to the bus controller, according to the transmission delay between the bus terminal and the bus controller, and adjusting transmission time of signals to be transmitted to the other bus terminals, according to the transmission delays between the bus terminal and the other bus terminals, so that the bus system is synchronized by clock-synchronization and symbol-synchronization of each bus terminal with the bus controller and adjusting the transmission delay between each bus terminal and the bus controller.

In a sixth aspect, an embodiment of the disclosure provides a synchronization apparatus on the basis of a field broadband bus architecture of an industrial Internet, wherein the bus architecture includes a bus controller and at least one bus terminal, and the bus terminal communicating with each other using the multi-carrier OFDM technology include:

a receiving unit configured to receive a downlink pilot signal transmitted by the bus controller in a downlink system subframe;

a determining unit configured to determine a clock offset and a symbol offset respectively between the bus terminal and the bus controller based upon the received downlink pilot signal, wherein the clock offset is used for correcting a clock for a signal to be transmitted, and the symbol offset is used for adjusting a window position of the signal to be transmitted; and an adjusting unit configured to obtain a locally stored transmission delay, and to correspondingly adjust the signal to be transmitted, based upon the clock offset, the symbol offset, and the transmission delay, wherein the transmission delay includes a delay between the bus terminal and the bus controller, and delays between the bus terminals.

Preferably the adjusting unit configured to correspondingly adjust the signal to be transmitted, based upon the clock offset, the symbol offset, and the transmission delay is configured:

to correct the clock for the received signal based upon the clock offset, and to correct the clock for the signal to be transmitted based upon the clock offset; and to adjust the window position of the received signal based upon the symbol offset, and to adjust the window position of the signal to be transmitted based upon the symbol offset, so that the the bus terminal is clock-synchronized and symbol-synchronized with the bus controller; and to adjust a transmission time of a signal to be transmitted to the bus controller, according to the transmission delay between the bus terminal and the bus controller, and to adjust transmission time of signals to be transmitted to the other bus terminals, according to the transmission delays between the bus terminal and the other bus terminals, so that the bus system is synchronized by clock-synchronization and symbol-synchronization of each bus terminal with the bus controller and adjusting the transmission delay between each bus terminal and the bus controller.

In a seventh aspect, an embodiment of the disclosure provides an electronic device including:

one or more processor; and one or more computer readable mediums on which program for synchronization on the basis of a field broadband bus architecture of an industrial Internet is stored, wherein the program performs the method according to any one of the embodiments in the fifth aspect above.

In an eighth aspect, an embodiment of the disclosure provides one or more computer readable mediums on which program for synchronization on the basis of a field broadband bus architecture of an industrial Internet is stored, wherein the program performs the method according to any one of the embodiments in the fifth aspect above.

In the embodiments of the disclosure, the bus terminal receives a downlink pilot signal transmitted by the bus controller in a downlink system subframe, and determines a clock offset and a symbol offset respectively between the bus terminal and the bus controller based upon the received downlink pilot signal; the bus terminal corrects a clock for a received signal based upon the clock offset, and corrects a clock for a signal to be transmitted, based upon the clock offset; and adjusts a window position of the received signal based upon the symbol offset, and adjusts a window position of the signal to be transmitted, based upon the symbol offset, so that the bus terminal is clock-synchronized and symbol-synchronized with the bus controller; and the bus terminal adjusts a transmission time of a signal to be transmitted to the bus controller, according to a transmission delay between the bus terminal and the bus controller, and adjusts transmission time of signals to be transmitted to the other bus terminals, according to transmission delays between the bus terminal and the other bus terminals, so that the bus system is synchronized by clock-synchronization and symbol-synchronization of each bus terminal with the bus controller and adjusting the transmission delay between each bus terminal and the bus controller. In the synchronization solution according to the embodiments of the disclosure, the bus controller will not perform clock synchronization and symbol synchronization; and all the bus terminals refer to the bus controller, and when receiving a signal, and transmitting a signal, they adjust a clock, and determine a window position, for the received signal, and the signal to be transmitted, adaptively according to the downlink pilot signal so as to synchronize their clocks and symbols with the bus controller. Furthermore all the bus terminals adjust a transmission of time for the signal to be transmitted, according to the transmission delay. In this way, all the bus terminals can be clock-synchronized and symbol-synchronized, and have their transmission delays adjusted so that all the devices in the bus system are synchronized to thereby provide an underlying guarantee for transmission of a hard real-time service. The bus controller will not adjust upon transmission or reception thereof. All the bus terminals in the bus system can be clock-synchronized and symbol-synchronized with the bus controller through physical-layer synchronization.

DETAILED DESCRIPTION

Figure 1A:
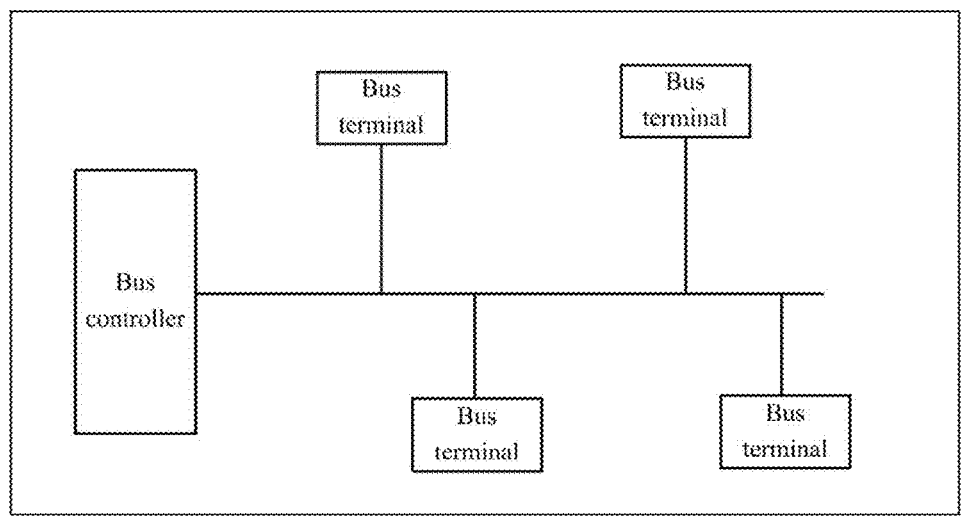
FIG. 1A is a schematic architectural diagram of a bus system according to an embodiment of the disclosure.

The technical solutions according to the embodiments of the disclosure will be described below clearly and fully with reference to the drawings in the embodiments of the disclosure, and apparently the embodiments described below are only a part but not all of the embodiments of the disclosure. Based upon the embodiments here of the disclosure, all the other embodiments which can occur to those skilled in the art without any inventive effort shall fall into the scope of the disclosure.

In order to make the entire bus system synchronized, and to provide an underlying guarantee for transmission of a hard real-time service, there is devised in the embodiments of the disclosure a synchronization method on the basis of a field broadband bus architecture based of an industrial Internet, where a bus terminal determines a clock offset and a symbol offset according to a downlink pilot signal transmitted by the bus controller, and adjusts a clock and a symbol respectively for synchronization; and furthermore the bus terminal adjusts a transmission time of a signal to be transmitted to another bus terminal according to a transmission delay between the bus terminal and the bus controller.

There is a rigorous deadline requirement for a hard real-time service, and if a deadline for a task is missed, then there may be an unpredictable aftereffect and even a serious disaster. The field bus system is required to be highly real-time and reliable, and if a deadline for a task is missed, then there may be a very serious aftereffect. In the synchronization method according to the embodiments of the disclosure, the bus controller neither performs clock synchronization nor performs symbol synchronization, but all the bus terminals refer to the bus controller, where a bus terminal receiving a signal or transmitting a signal corrects a clock adaptively, and determines a window position, for the received signal, and the signal to be transmitted, according to the downlink pilot signal to thereby synchronize its clock and symbol with the bus controller without adjusting any local clock; and all the bus terminals adjust a transmission time for a signal to be transmitted, according to the transmission delay. In this way, all the bus terminals synchronize their clocks and symbols, and adjust their transmission delays so that all the devices on the bus system are synchronized to thereby provide an underlying guarantee for transmission of a hard real-time service. The bus controller neither performs clock synchronization nor performs symbol synchronization when transmitting or receiving a signal.

A preferred embodiment of the disclosure will be described below with reference to the drawings.

Firstly a bus terminal receives a downlink pilot signal transmitted by the bus controller in a downlink system subframe.

Then the bus terminal determines a clock offset and a symbol offset respectively between the bus terminal and the bus controller based upon the received downlink pilot signal, where the clock offset is used for correcting a clock for a signal to be transmitted, and the symbol offset is used for adjusting a window position of the signal to be transmitted.

Lastly the bus terminal obtains a locally stored transmission delay, and correspondingly adjusts the signal to be transmitted, based upon the clock offset, the symbol offset, and the transmission delay. The transmission delay includes a delay between the bus terminal and the bus controller, and delays between the respective bus terminals.

Preferred embodiments of the disclosure will be described below with reference to the drawings.

As illustrated in FIG. 1A, a field broadband bus architecture of industrial Internet according to an embodiment of the disclosure includes: a bus controller, at least one bus terminal, and a two-wire bus, and the bus controller and the at least one bus terminal are connected over the two-wire bus to constitute a bus system, where the bus controller communicates with any of the at least one bus terminal, and the bus terminal communicates with each other, using the Orthogonal Frequency Division Multiplexing (OFDM) technology, and sub-carriers occupied by the bus terminal do not interfere with each other. The bus system according to the embodiment of the disclosure can satisfy demands for being highly real-time, a high bandwidth, and a high speed, and data can be transmitted over the bus at a bandwidth above hundreds of megahertz without any switch.

Furthermore in the embodiment of the disclosure, the bus terminals can communicate directly with each other, or the bus terminals can communicate with each other through the bus controller, that is, one of the bus terminals transmits the data to the bus controller, and the bus controller further forwards the data to the corresponding bus terminal. The bus controller controls communication throughout the network to thereby configure and initialize the network, and schedule physical layer channel resources, and also the bus controller can further control the bus terminal to communicate with the outside at a high speed.

The two-wire bus is a pair of differential bus with two lines. The differential bus with two lines is a pair of wires over which differential signals are carried. The differential signals refer to two signals transmitted by a driver, which have the same amplitude and opposite phases, and a receiver determines a logic state as "0" or "1" by comparing the difference between these two voltages. The two-wire bus is a field broadband bus, e.g., two-wire bus being a pair of differential bus with two lines over which signals are transmitted using the OFDM technology.

In some special application scenario, for example, where particularly high reliability is required, two identical but independent buses can be configured, each user equipment can access the two buses concurrently, and the two buses operate as a spare bus of each other, but only one of them operates at a time.

In the OFDM technology, allotted channels are divided into a number of orthogonal sub-channels in the frequency domain, and data over each sub-channel are modulated using a sub-carrier, and the respective sub-carriers are transmitted concurrently. The OFDM technology can overcome the multi-path effect, eliminate Inter-Symbol Interference (ISI), suppress frequency-selective attenuation, and operate with a high utilization ratio of channels. The OFDM technology can be regarded as a modulation technology and a multi-task technology, which is a multi-carrier transmission scheme.

The so-called multi-path effect refers to an interference delay effect arising from multi-path transmission over an electric wave propagation channel. The so-called ISI refers to an influence of a signal over the i-th path to a signal over the first path due to multi-path transmission.

Figure 1B:
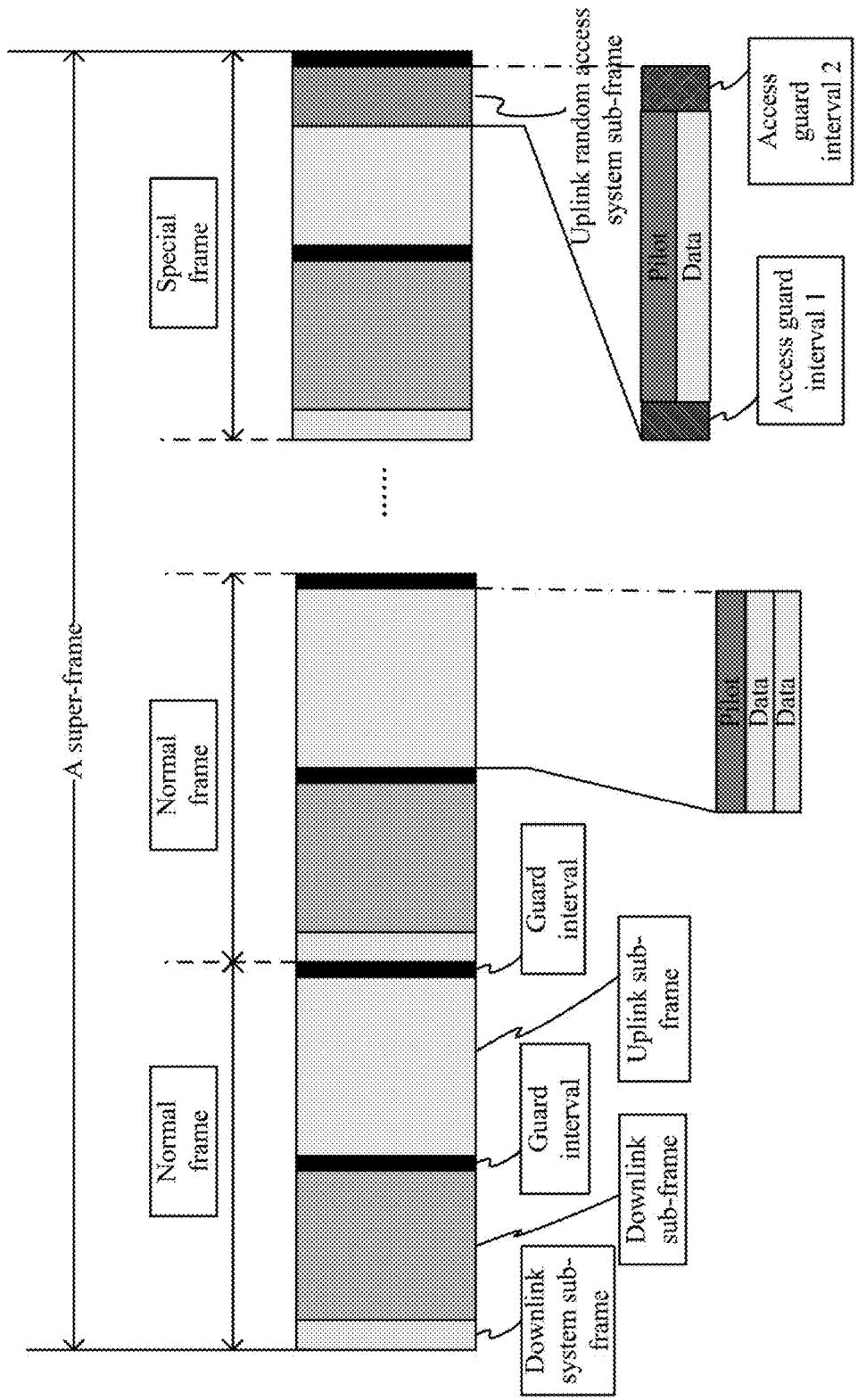
FIG. 1B is a schematic diagram of a frame structure in the bus system according to the embodiment of the disclosure.

The bus controller transmits data with the bus terminal in a time-division duplex mode. In the embodiments of the disclosure, the OFDM technology is introduced to the field bus, and also a frame structure of a signal frame is designed. As illustrated in FIG. 1B, a schematic diagram of a frame structure in the bus system according to the embodiment of the disclosure is provided. The elementary unit of physical layer signal is a signal frame, 256 signal frames constitute a super-frame, the last signal frame in the super-frame is a special frame, and other signal frames in the super-frame are normal frames. The signal frame includes multiple OFDM symbols.

The normal frame includes a downlink system subframe, a downlink subframe, a guard interval, an uplink subframe, and a guard interval successively in the time domain. The special frame includes a downlink system subframe, a downlink subframe, a guard interval, an uplink subframe, an access guard interval 1, a random access system subframe, and an access guard interval 2. The guard interval reserves a period of time for switching between the downlink subframe and the uplink subframe in the signal frame. There are the access guard interval 1 and the access guard interval 2 on both sides of the uplink random access system subframe in the special frame.

Uplink data are transmitted in the uplink subframe. Optionally both a data signal and an uplink pilot signal are carried in an OFDM symbol in the uplink subframe.

The random access system subframe reserves a period of time for a bus terminal temporarily or newly accessing the bus. Optionally both an uplink pilot signal and a data signal are carried in an OFDM symbol in the random access system subframe, where the data signal can be an access request, for example. The number of sub-carriers occupied by the uplink data signal and the number of sub-carriers occupied by the uplink pilot signal in the frequency domain are arranged alternately according to some proportional relationship, where the ratio of the allocated sub-carriers occupied by the uplink data signal to the allocated sub-carriers occupied by the uplink pilot signal can be preset as needed in reality, and preferably preset to 2:1. The uplink pilot signal can instruct the bus controller to perform channel estimation. Stated otherwise, the bus controller can extract the uplink pilot signal to perform channel estimation, upon reception of the data transmitted by the bus terminal in the uplink subframe, and specifically the bus controller can calculate an approximate impulse response of the channel using the uplink system subframe to approximate a real channel impulse response as much as possible to thereby compensate for the channel.

Downlink data are transmitted in the downlink subframe. The downlink system subframe includes two OFDM symbols, dedicated to transmission of two downlink pilot signals, where each OFDM symbol in the downlink system subframe is dedicated to transmission of a downlink pilot signal by the bus controller. Optionally the downlink system subframe is the first subframe in the signal frame. The downlink pilot signal can be used for both system synchronization and channel estimation.

Moreover the respective bus terminals communicating with the bus controller using the OFDM technology can further communicate directly with each other over the bus using the OFDM technology, for example, the bus terminal A can transmit data to the bus terminal B over uplink subframe channel resource blocks occupied by the bus terminal A, and furthermore the bus terminal B can also transmit data to the bus terminal A over uplink subframe channel resource blocks occupied by the bus terminal B upon reception of the data transmitted by the bus terminal A.

Figure 2:
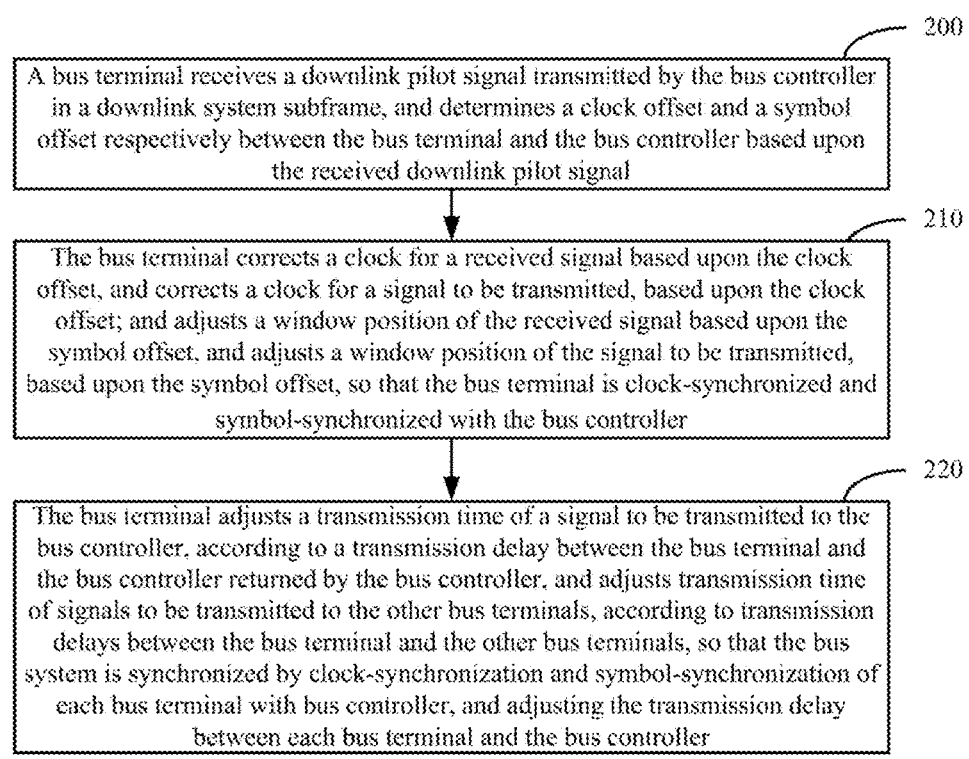
FIG. 2 is a flow chart of a synchronization method on the basis of a field broadband bus architecture of an industrial Internet according to a first embodiment of the disclosure.

Referring to FIG. 2 which is a flow chart of a synchronization method on the basis of a field broadband bus architecture of an industrial Internet according to an embodiment of the disclosure, each bus terminal performs the following steps.

Step 200, a bus terminal receives a downlink pilot signal transmitted by the bus controller in a downlink system subframe, and determines a clock offset and a symbol offset respectively between the bus terminal and the bus controller based upon the received downlink pilot signal.

Specifically the bus controller firstly transmits two downlink pilot signals carried in two OFDM symbols in the downlink system subframe to the respective bus terminals. The downlink system subframe is the first subframe in each signal frame which is a special frame or a normal frame.

The bus terminal can calculate the clock offset and the symbol offset according to the two downlink pilot signals in the current downlink system subframe, or can calculate the clock offset and the symbol offset according to one or both of the downlink pilot signals in the current downlink system subframe, and one or both of pilot signals in a downlink system subframe of the last signal frame.

The clock offset can be calculated as follows.

The two downlink pilot signals are conjugated and multiplied, and sub-carriers of the two downlink pilot signals are further conjugated and multiplied, so the difference between them is the clock offset.

Step 210, the bus terminal corrects a clock for a received signal based upon the clock offset, and corrects a clock for a signal to be transmitted, based upon the clock offset; and adjusts a window position of the received signal based upon the symbol offset, and adjusts a window position of the signal to be transmitted, based upon the symbol offset, so that the bus terminal is clock-synchronized and symbol-synchronized with the bus controller.

Optionally the window position can be a window position of Fast Fourier Transformation (FFT). The bus terminal can calculate the symbol offset using a symbol synchronization algorithm based upon a pilot phase difference, and determine the window position of FFT.

During the initialization of system, symbol synchronization is typically coarse synchronization, where a relative relationship, between the real start position, at which the current symbol is received, of the currently received symbol and an ideal synchronization position of the currently received symbol, is determined using a symbol synchronization algorithm, to determine whether the real start position at which the current symbol is received is before or after the ideal synchronization position, to accordingly adjust the synchronization position iteratively, to determine the adjusted synchronization position as the current synchronization position, to receive the next OFDM, and to repeat the steps above until the system is synchronized as required. After the system operates stably, symbol synchronization is typically fine synchronization. After coarse symbol synchronization is finished, the symbol offset or the position offset lies within an allowable range, and is further adjusted finely through fine synchronization to thereby further alleviate the symbol offset or the position offset.

In the embodiment of the disclosure, the respective bus terminals in the bus system firstly correct the clocks for the received signal, and the signal to be transmitted, according to the clock offset so that the bus terminals is clock-synchronized and symbol-synchronized with the bus controller. The window position of FFT is located according to the symbol offset so that the bus terminals are symbol-synchronized with the bus controller. In this way, the bus terminals which are clock-synchronized and symbol-synchronized can subsequently receive the signal issued by the bus controller correctly.

Step 220, the bus terminal adjusts a transmission time of a signal to be transmitted to the bus controller, according to a transmission delay between the bus terminal and the bus controller returned by the bus controller, and adjusts transmission time of signals to be transmitted to the other bus terminals, according to transmission delays between the bus terminal and the other bus terminals, so that each bus terminal is clock-synchronized and symbol-synchronized with the bus controller, and the transmission delay thereof is adjusted, thus being synchronized with the bus system.

Specifically firstly the bus controller determines a transmission time of an access request message transmitted by the bus terminal based upon a reception time of the obtained access request message, and transmission time corresponding to a specified number of OFDM symbols in the uplink subframe upon reception of an access request message.

Then the bus terminal determines a transmission delay between the bus terminal and the bus controller based upon the reception time of the access request message, and the transmission time of the access request message, and transmits an access acknowledgement message carrying the transmission delay between the bus terminal and the bus controller to the bus terminal.

Lastly the bus terminal receives the access acknowledgement message transmitted by the bus controller in the downlink subframe, and adjusts a transmission time of a signal to be transmitted to the bus controller according to the transmission delay between the bus terminal and the bus controller.

In this way, all the bus terminals refer to the bus controller, and when receiving a signal, and transmitting a signal, all the bus terminals adjust adaptively according to the downlink pilot signal so as to synchronize their clocks and symbols with the bus controller. The bus controller will not adjust upon transmission or reception thereof. All the bus terminals on the bus system can be clock-synchronized and symbol-synchronized with the bus controller through physical-layer synchronization, i.e., in the clock synchronization and symbol synchronization processes. Moreover, system-level synchronization can be achieved through clock synchronization and symbol synchronization, and by adjusting a transmission delay to thereby provide an underlying guarantee for transmission of a hard real-time service.

Figure 3A:
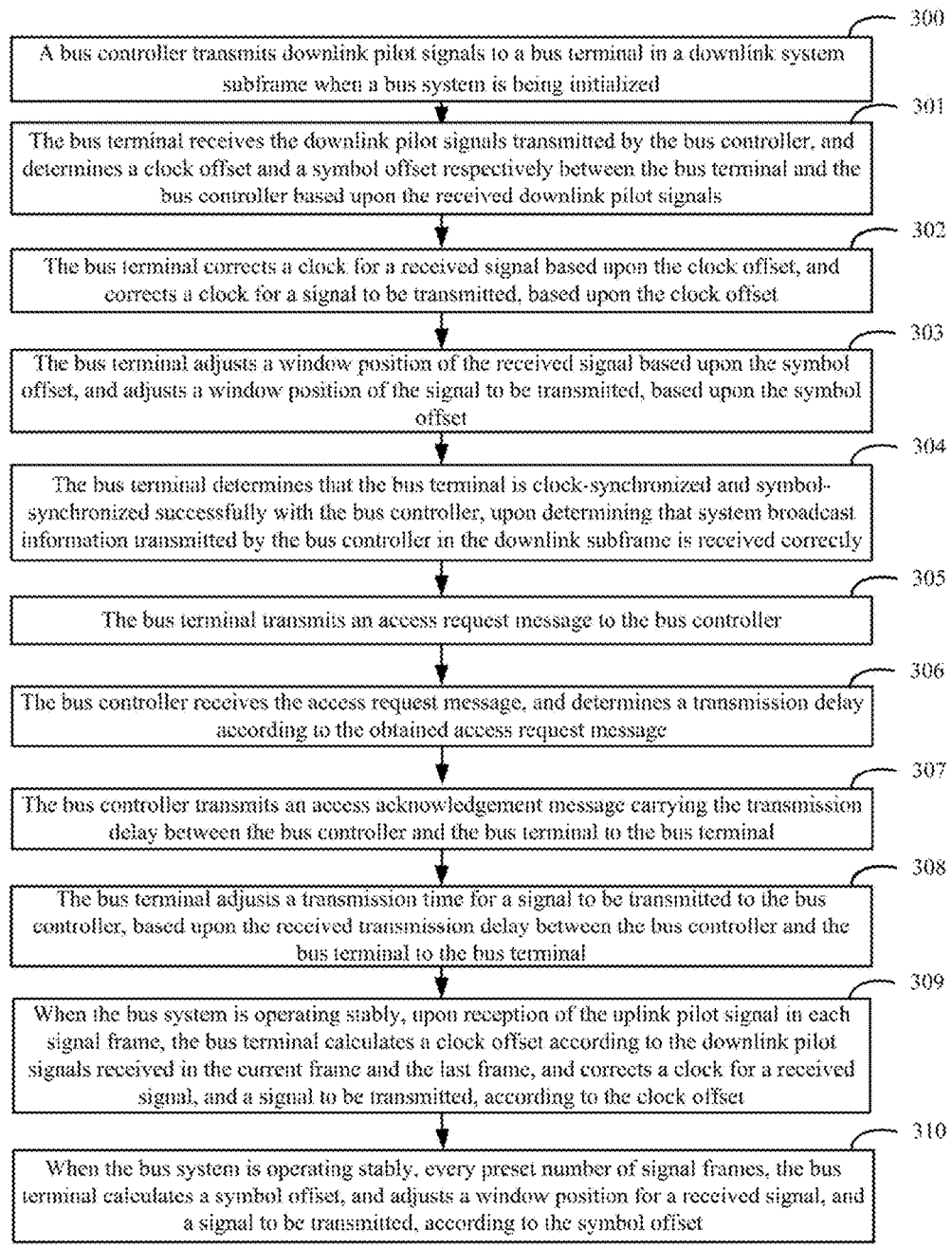
FIG. 3A is a flow chart of a synchronization method on the basis of a field broadband bus architecture of an industrial Internet according to a second embodiment of the disclosure.

Referring to FIG. 3A which illustrates a specific synchronization flow on the basis of a field broadband bus architecture of an industrial Internet according to an embodiment of the disclosure, each bus terminal performs the following steps.

Step 300, a bus controller transmits downlink pilot signals to a bus terminal in a downlink system subframe.

Specifically the bus controller transmits two downlink pilot signals carried in two OFDM symbols in the downlink system subframe to the respective bus terminals. The downlink system subframe is the first subframe in each signal frame which is a special frame or a normal frame.

Step 301, the bus terminal receives the downlink pilot signals transmitted by the bus controller, and determines a clock offset and a symbol offset respectively between the bus terminal and the bus controller based upon the received downlink pilot signals.

Specifically the bus system is initialized, and the bus terminal obtains the clock offset according to the two received downlink pilot signals upon each reception of the downlink pilot signals in the current downlink system subframe.

The clock offset can be calculated as follows.

The two downlink pilot signals are conjugated and multiplied, and sub-carriers of the two downlink pilot signals are further conjugated and multiplied, so the difference between them is the clock offset.

In this way, the corresponding clock offset and symbol offset are estimated using the two downlink pilot signals in the same downlink system subframe, and since the two downlink pilot signals are spaced by a short period of time, the clock offset and symbol offset can be estimated less accurately in a larger range, which is suitable for initialization of the bus system.

Here an upper limit of the difference is typically 100 ppm, that is, a difference of 100 parts is allowable for 1000 thousands of parts.

Step 302, the bus terminal corrects a clock for a received signal based upon the clock offset, and corrects a clock for a signal to be transmitted, based upon the clock offset.

In this way, the bus terminal can be clock-synchronized with the bus controller, and the the bus terminal can be clock-synchronized with the other bus terminals.

Step 303, the bus terminal adjusts a window position of the received signal based upon the symbol offset, and adjusts a window position of the signal to be transmitted, based upon the symbol offset.

Specifically when the step 303 is performed, the window position may refer to a window position of FFT. The window position of FFT can be determined using a symbol synchronization algorithm based upon a pilot phase difference.

In this way, the bus terminal can be symbol-synchronized with the bus controller, and the bus terminal can be symbol-synchronized with the other bus terminals.

Each signal frame includes a downlink system subframe, dedicated to transmission of a downlink pilot signal, and the first subframe in each signal frame is the downlink system subframe, so the downlink pilot signal carried in the downlink system subframe is arranged densely, so that the bus terminal can synchronize its clock and symbol based upon each signal frame to thereby greatly improve the error correction capability throughout the bus system in terms of clock and symbol synchronization.

Step 304, the bus terminal determines that the bus terminal is clock-synchronized successfully with the bus controller, and the bus terminal is symbol-synchronized successfully with the bus controller, upon determining that system broadcast information transmitted by the bus controller in the downlink subframe is received correctly.

In a real application, the step 300 to the step 340 may be performed in the same signal frame, or may be performed in a plurality of signal frames. After clock synchronization and symbol synchronization succeeds, physical-layer synchronization of the bus system finishes. In the embodiment of the disclosure, clock synchronization and symbol synchronization of all the bus terminals and the bus controller in the bus system is achieved through physical-layer synchronization.

Step 305, the bus terminal transmits an access request message to the bus controller.

Specifically the step 305 can be performed in the following two implementations.

In a first implementation, when the bus terminal is a bus terminal initially accessing the bus controller, then an OFDM symbol can be selected randomly in the uplink subframe in the normal frame, and the access request message can be carried in the selected OFDM symbol, and transmitted to the bus controller.

Subsequent to physical-layer synchronization, each bus terminal selects randomly resource block(s) in the uplink subframe in the normal frame, and transmits the access request message over the resource block(s). The bus controller calculates access control such as a transmission time delay between the bus terminal and the bus controller upon reception of the access request message, and then transmits an access request acknowledgement message in the downlink subframe so that the bus terminal initially accesses the bus controller. After all the bus terminals initially access the bus controller, the physical-layer initial access is finished. The resource blocks in the uplink subframe include two consecutive OFDM symbols in the time domain, and even sub-carriers throughout an upper band or a lower band in the frequency domain.

In a second implementation, when the bus terminal is a bus terminal accessing the bus controller randomly, then the bus terminal transmits an access request message and an uplink pilot signal to the bus controller in the random access system subframe in the special frame.

The bus terminal randomly accessing the bus controller is a bus terminal temporally or newly accessing the bus. There may be a temporally or newly accessing bus terminal while a service is being transmitted normally, and at this time, the access request of the bus terminal is handled in a random access procedure. The bus terminal firstly proceeds to physical-layer synchronization. Subsequent to physical-layer synchronization, the bus terminal randomly selects resource blocks of two consecutive random access system subframes, and transmits the access request message over the resource blocks. During the random access at the physical layer, the resource blocks in the random access system subframe include even sub-carriers throughout an upper band or a lower band in the frequency domain, and resource blocks of the two consecutive random access system subframes, selected randomly by the bus terminal, have the same frequency position.

An OFDM symbol in an uplink subframe in a normal frame carries an access request message, and an OFDM symbol in a random access system subframe in a special frame carries both an uplink pilot signal and an access request message. The uplink pilot signal is used for channel estimation, and furthermore a super-frame includes 256 signal frames, where the last signal frame in each super-frame is a special frame, and the other signal frames are normal frames.

In this way, the bus terminal accessing randomly the bus controller further transmits an uplink pilot signal to the bus controller in a special frame so that the bus controller can perform channel estimation according to the uplink pilot signal.

Step 306, the bus controller receives the access request message, and determines a transmission delay according to the obtained access request message.

Specifically the bus controller firstly receives the access request message transmitted by the bus terminal, and obtains a reception time of the access request message.

Then the bus controller obtains transmission time corresponding to a specified number of OFDM symbols in the uplink subframe, and determines the transmission time corresponding to the OFDM symbol, which is earlier than the reception time and has a minimum difference with the reception time, as a transmission time of the access request message.

The transmission time of each OFDM symbol is preset, so the bus controller can obtain the start time corresponding to each OFDM symbol directly.

Next the bus terminal determines the transmission delay between the bus terminal and the bus controller according to the difference between the reception time of the access request message, and the transmission time of the access request message.

Figure 3B:
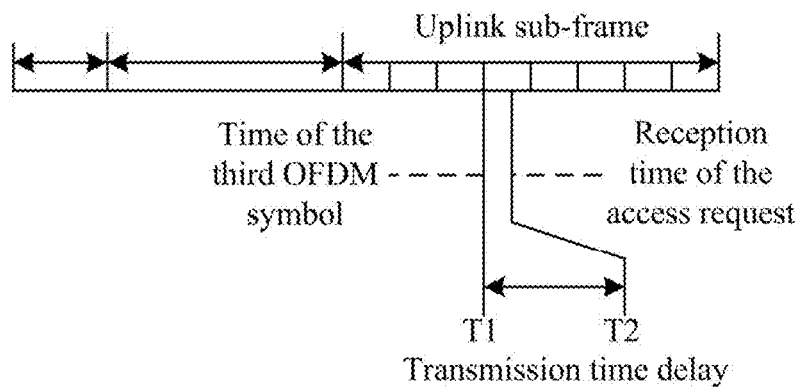
FIG. 3B is a schematic diagram of transmission timing of a signal frame according to the second embodiment of the disclosure.

Referring to FIG. 3B, for example, the transmission time corresponding to the zero-th OFDM symbol in the uplink subframe is 1:00, the transmission time corresponding to the first OFDM symbol is 1:05, the transmission time corresponding to the second OFDM symbol is 1:10, and the transmission time corresponding to the third OFDM symbol is 1:15. The bus controller receives the access request message transmitted by the bus terminal at T2 (1:17), and determines that the access request message is transmitted by the bus terminal in the third OFDM symbol in the uplink subframe, and further determines that the transmission time of the access request message is T1 (1:15), according to the transmission time corresponding to the respective OFDM symbols. Then the bus controller determines the transmission delay between the bus terminal and the bus controller as T2-T1.

Furthermore the data transmitted by the bus terminal in the uplink subframe can also be received by the other bus terminals in the uplink subframe, so each of the receiving bus terminals can determine the transmission delay between the receiving bus terminal and the transmitting bus terminal, according to the time when the receiving bus terminal receives the data and also the transmission time of the OFDM symbols, and then transmit the obtained transmission delay to the transmitting bus terminal in the uplink subframe of the next signal frame.

For example, the bus terminal A transmits data to the bus terminal B in the uplink subframe, and after the bus terminal B receives the data of the bus terminal A, the bus terminal B can determine a transmission delay between the bus terminal B and the bus terminal A according to the reception time of the data, and the transmission time of the OFDM symbols, and then can transmit the obtained transmission delay to the bus terminal A in the uplink subframe of the next signal frame.

In this way, the transmission delay between the bus terminal and the bus controller due to the distance between them, and a transmission delay between every two bus terminals can be determined.

Step 307, the bus controller transmits an access acknowledgement message carrying the transmission delay between the bus controller and the bus terminal to the bus terminal.

Step 308, the bus terminal adjusts transmission time for a signal to be transmitted to the bus controller, based upon the received transmission delay between the bus controller and the bus terminal.

Furthermore the bus terminal adjusts transmission time of signals to be transmitted to the other bus terminals, based upon the transmission delays between the bus terminal and the respective other bus terminals. After the bus architecture is initialized, the bus system proceeds to stable operation.

Step 309, when the bus system is operating stably, the bus terminal calculates a clock offset according to the downlink pilot signals received in the current frame and the last frame upon reception of the uplink pilot signal in each signal frame, and corrects a clock for a received signal, and a signal to be transmitted, according to the clock offset.

Specifically when the bus system is operating stably, upon each reception of the downlink pilot signal in the current downlink system subframe, the bus terminal determines the clock offset between the bus terminal and the bus controller based upon the downlink pilot signal received in the current downlink system subframe, and the downlink pilot signal received in the last downlink system subframe.

Specifically upon each reception of the downlink pilot signal in the current downlink system subframe, the bus terminal conduct conjugate multiplication on the downlink pilot signal received in the current downlink system subframe, and the downlink pilot signal received in the last downlink system subframe, conduct conjugate multiplication on the sub-carriers of the two downlink pilot signals, and then calculate difference of them to obtain the clock offset.

The downlink pilot signal(s) obtained by the bus terminal for calculating a clock offset in a downlink system subframe may be one or two downlink pilot signals.

Step 310, when the bus system is operating stably, every preset number of signal frames, the bus terminal calculates a symbol offset and adjusts a window position for a received signal, and a signal to be transmitted, according to the symbol offset.

Specifically every preset number of signal frames, the bus terminal determines the symbol offset between the bus terminal and the bus controller based upon the downlink pilot signal received in the current downlink system subframe, and the downlink pilot signal received in the last downlink system subframe; and adjust the window position of the received signal, and the signal to be transmitted, according to the symbol offset, so that all the bus terminals refer to the bus controller, and when receiving a signal, and transmitting a signal, all the bus terminals adjust adaptively according to the downlink pilot signal so as to synchronize their clocks and symbols with the bus controller. The bus controller will not adjust upon transmission or reception thereof. All the bus terminals in the bus system can be clock-synchronized and symbol-synchronized with the bus controller through physical-layer synchronization. Moreover, system-level synchronization can be achieved through clock synchronization and symbol synchronization, and by adjusting a transmission delay to thereby provide an underlying guarantee for transmission of a hard real-time service.

An embodiment of the disclosure provides an electronic device including: one or more processor; and one or more computer readable mediums on which program for synchronization on the basis of a field broadband bus architecture of an industrial Internet is stored, where the program performs the respective steps in the embodiments above upon being executed by one or more processors.

An embodiment of the disclosure provides one or more computer readable mediums on which program for synchronization on the basis of a field broadband bus architecture of an industrial Internet is stored, where the program performs the respective steps in the embodiments above upon being executed by one or more processors.

Figure 4:
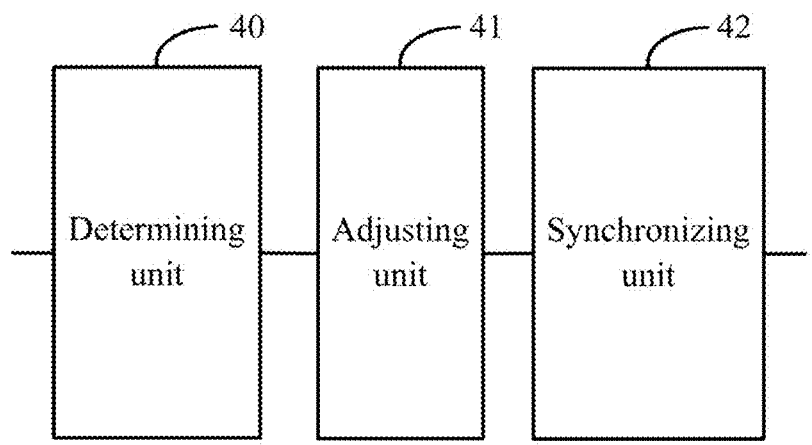
FIG. 4 is a schematic structural diagram of a first synchronization apparatus on the basis of a field broadband bus architecture of an industrial Internet according to an embodiment of the disclosure.

Based upon the embodiments above, reference is made to FIG. 4 which is a schematic structural diagram of a first synchronization apparatus on the basis of a field broadband bus architecture of an industrial Internet according to an embodiment of the disclosure. In the embodiment of the disclosure, the field broadband bus architecture of an industrial Internet includes: a bus controller, at least one bus terminal, and a two-wire bus, and the bus controller and the bus terminal are connected over the two-wire bus to constitute a bus system, where the bus controller communicates with any one of the at least one bus terminal, and the respective bus terminals communicate with each other, using the Orthogonal Frequency Division Multiplexing (OFDM) technology, and sub-carriers occupied by the respective bus terminals do not interfere with each other; and the synchronization apparatus applicable to each bus terminal includes the following units.

A determining unit 40 is configured to receive a downlink pilot signal transmitted by the bus controller in a downlink system subframe, and to determine a clock offset and a symbol offset respectively between the bus terminal and the bus controller based upon the received downlink pilot signal.

An adjusting unit 41 is configured to correct a clock for a received signal based upon the clock offset, and to correct a clock for a signal to be transmitted based upon the clock offset; and to adjust a window position of the received signal based upon the symbol offset, and to adjust a window position of the signal to be transmitted based upon the symbol offset, so that the bus terminal is clock-synchronized and symbol-synchronized with the bus controller.

A synchronizing unit 42 is configured to adjust a transmission time of a signal to be transmitted to the bus controller, according to a transmission delay between the bus terminal and the bus controller, and to adjust transmission time of signals to be transmitted to the other bus terminals, according to transmission delays between the bus terminal and the other bus terminals, so that the bus system is synchronized by clock-synchronization and symbol-synchronization of each bus terminal with the bus controller and adjusting the transmission delay between each bus terminal and the bus controller.

Preferably the determining unit 40 configured to determine the clock offset and the symbol offset respectively between the bus terminal and the bus controller based upon the received downlink pilot signal is configured:

When the bus system is being initialized, upon each reception of the downlink pilot signals in the current downlink system subframe, to determine the clock offset and the symbol offset respectively between the bus terminal and the bus controller according to two downlink pilot signals received in the current downlink system subframe; or When the bus system is operating stably, upon each reception of the downlink pilot signal in the current downlink system subframe, to determine the clock offset respectively between the bus terminal and the bus controller according to a downlink pilot signal received in the current downlink system subframe, and a downlink pilot signal received in the last downlink system subframe, and every preset number of signal frames, to determine the symbol offset between the bus terminal and the bus controller according to the downlink pilot signal received in the current downlink system subframe, and the downlink pilot signal received in the last downlink system subframe.

Preferably after the bus terminal corrects the clock for the received signal based upon the clock offset, corrects a clock for the signal to be transmitted based upon the clock offset, adjusts the window position of the received signal based upon the symbol offset and adjusts the window position of the signal to be transmitted based upon the symbol offset, and before the bus terminal adjusts the transmission time of the signal to be transmitted to the bus controller, according to the transmission delay between the bus terminal and the bus controller returned by the bus controller, the adjusting unit 41 is further configured:

for the bus terminal to determine that the bus terminal is clock-synchronized successfully with the bus controller, and the bus terminal is symbol-synchronized successfully with the bus controller, upon determining that system broadcast information transmitted by the bus controller in a downlink subframe is received correctly.

Preferably after it is determined that the bus terminal is clock-synchronized successfully with the bus controller, and the bus terminal is symbol-synchronized successfully with the bus controller, and before the bus terminal adjusts the transmission time of the signal to be transmitted to the bus controller, according to the transmission delay between the bus terminal and the bus controller, the adjusting unit 41 is further configured:

when the bus terminal is a bus terminal initially accessing the bus controller, to transmit an access request message to the bus controller in an uplink subframe in a normal frame, to trigger the bus controller to return an access acknowledgement message to the bus terminal in response to the access request message, wherein the access acknowledge message carries the transmission delay between the bus terminal and the bus controller, and to receive the access acknowledgement message transmitted by the bus controller in a downlink subframe, where the normal frame is a signal frame including the downlink system subframe, the downlink subframe, and the uplink subframe; or when the bus terminal is a bus terminal accessing randomly the bus controller, to transmit an access request message to the bus controller in a random access system subframe in a special frame, to trigger the bus controller to return an access acknowledgement message to the bus terminal in response to the access request message, wherein the access acknowledge message carries the transmission delay between the bus terminal and the bus controller, and to receive the access acknowledgement message transmitted by the bus controller in a downlink subframe, where the special frame is a signal frame including the downlink system subframe, the downlink subframe, an uplink subframe, and the random access system subframe.

Preferably the adjusting unit 41 configured to trigger the bus controller to return the access acknowledgement message to the bus terminal in response to the access request message, the access acknowledge message carrying the transmission delay between the bus terminal and the bus controller is further configured:

To trigger the bus controller:
To obtain a reception time of the access request message, and to obtain transmission time corresponding to a specified number of OFDM symbols in the uplink subframe;
To determine the transmission time corresponding to the OFDM symbol, which is earlier than the reception time and has a minimum difference with the reception time, as a transmission time of the access request message; and
To determine the transmission delay between the bus terminal and the bus controller according to the difference between the reception time of the access request message, and the transmission time of the access request message, and to transmit the access acknowledgement message carrying the transmission delay between the bus terminal and the bus controller to the bus terminal.

Preferably the downlink system subframe is the first subframe in each signal frame which is a special frame or a normal frame.

Figure 5:
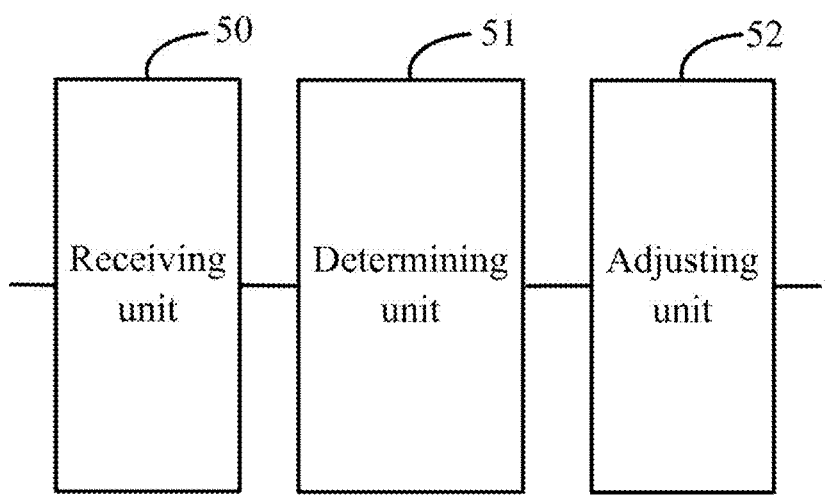
FIG. 5 is a schematic structural diagram of a second synchronization apparatus on the basis of a field broadband bus architecture of an industrial Internet according to an embodiment of the disclosure.

Further to the embodiments above, reference is made to FIG. 5 which is a schematic structural diagram of a second synchronization apparatus on the basis of a field broadband bus architecture of an industrial Internet. In the embodiment of the disclosure, the synchronization apparatus on the basis of a field broadband bus architecture of an industrial Internet specifically includes the following units.

A receiving unit 50 is configured to receive a downlink pilot signal transmitted by the bus controller in a downlink system subframe.

A determining unit 51 is configured to determine a clock offset and a symbol offset respectively between the bus terminal and the bus controller based upon the received downlink pilot signal, where the clock offset is used for correcting a clock for a signal to be transmitted, and the symbol offset is used for adjusting a window position of the signal to be transmitted.

An adjusting unit 52 is configured to obtain a locally stored transmission delay, and to correspondingly adjust the signal to be transmitted, based upon the clock offset, the symbol offset, and the transmission delay, where the transmission delay includes a delay between the bus terminal and the bus controller, and delays between the bus terminals.

In the embodiments of the disclosure, the bus terminal receives a downlink pilot signal transmitted by the bus controller in a downlink system subframe, and determines a clock offset and a symbol offset respectively between the bus terminal and the bus controller based upon the received downlink pilot signal; the bus terminal corrects a clock for a received signal based upon the clock offset, and corrects a clock for a signal to be transmitted, based upon the clock offset; and adjusts a window position of the received signal based upon the symbol offset, and adjusts a window position of the signal to be transmitted, based upon the symbol offset, so that the bus terminal is clock-synchronized and symbol-synchronized with the bus controller; and the bus terminal adjusts a transmission time of a signal to be transmitted to the bus controller, according to a transmission delay between the bus terminal and the bus controller, and adjusts transmission time of signals to be transmitted to the other bus terminals, according to transmission delays between the bus terminal and the other bus terminals, so that the bus system is synchronized by clock-synchronization and symbol-synchronization of each bus terminal with the bus controller and adjusting the transmission delay between each bus terminal and the bus controller. In this way, all the bus terminals refer to the bus controller, and when receiving a signal, and transmitting a signal, all the bus terminals adjust adaptively according to the downlink pilot signal so as to synchronize their clocks and symbols with the bus controller. The bus controller will not adjust upon transmission or reception thereof. All the bus terminals on the bus system can be clock-synchronized and symbol-synchronized with the bus controller through physical-layer synchronization. Moreover, system-level synchronization can be achieved through clock synchronization and symbol synchronization, and by adjusting a transmission delay to thereby provide an underlying guarantee for transmission of a hard real-time service.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A synchronization method on the basis of a field broadband bus architecture of an industrial Internet, wherein the field broadband bus architecture of an industrial Internet comprises: a bus controller, at least one bus terminal, and a two-wire bus, and the bus controller and the at least one bus terminal are connected over the two-wire bus to constitute a bus system; the bus controller communicates with any of the at least one bus terminal, and the bus terminal communicates with each other, using the Orthogonal Frequency Division Multiplexing (OFDM) technology, and sub-carriers occupied by the bus terminal do not interfere with each other; and the synchronization method applicable to each bus terminal comprises:

receiving, by the bus terminal, a downlink pilot signal transmitted by the bus controller in a downlink system subframe, and determining a clock offset and a symbol offset respectively between the bus terminal and the bus controller based upon the received downlink pilot signal;

correcting, by the bus terminal, a clock for a received signal based upon the clock offset, and correcting a clock for a signal to be transmitted based upon the clock offset; and adjusting a window position of the received signal based upon the symbol offset, and adjusting a window position of the signal to be transmitted based upon the symbol offset, so that the bus terminal is clock-synchronized and symbol-synchronized with the bus controller; and adjusting, by the bus terminal, a transmission time of a signal to be transmitted to the bus controller, according to a transmission delay between the bus terminal and the bus controller, and adjusting transmission time of signals to be transmitted to the other bus terminals, according to transmission delays between the bus terminal and the other bus terminals, so that the bus system is synchronized by clock-synchronization and symbol-synchronization of each bus terminal with the bus controller and adjusting the transmission delay between each bus terminal and the bus controller.

2. The method according to claim 1, wherein determining the clock offset and the symbol offset respectively between the bus terminal and the bus controller based upon the received downlink pilot signal comprises:

when the bus system is being initialized, upon each reception of the downlink pilot signals in a current downlink system subframe, determining, by the bus terminal, the clock offset and the symbol offset respectively between the bus terminal and the bus controller according to two downlink pilot signals received in the current downlink system subframe; or when the bus system is operating stably, upon each reception of the downlink pilot signal in the current downlink system subframe, determining, by the bus terminal, the clock offset respectively between the bus terminal and the bus controller according to a downlink pilot signal received in the current downlink system subframe, and a downlink pilot signal received in a last downlink system subframe, and every preset number of signal frames, determining the symbol offset between the bus terminal and the bus controller according to the downlink pilot signal received in the current downlink system subframe, and the downlink pilot signal received in the last downlink system subframe.

3. The method according to claim 1, wherein after the bus terminal corrects the clock for the received signal based upon the clock offset, corrects the clock for the signal to be transmitted based upon the clock offset, adjusts the window position of the received signal based upon the symbol offset and adjusts the window position of the signal to be transmitted based upon the symbol offset, and before the bus terminal adjusts the transmission time of the signal to be transmitted to the bus controller, according to the transmission delay between the bus terminal and the bus controller returned by the bus controller, the method further comprises:

determining, by the bus terminal, that the bus terminal is clock-synchronized successfully with the bus controller, and the bus terminal is symbol-synchronized successfully with the bus controller, upon determining that system broadcast information transmitted by the bus controller in a downlink subframe is received correctly.

4. The method according to claim 3, wherein after it is determined that the bus terminal is clock-synchronized successfully with the bus controller, and the bus terminal is symbol-synchronized successfully with the bus controller, and before the bus terminal adjusts the transmission time of the signal to be transmitted to the bus controller, according to the transmission delay between the bus terminal and the bus controller, the method further comprises:

when the bus terminal is a bus terminal initially accessing the bus controller, transmitting an access request message to the bus controller in an uplink subframe in a normal frame, to trigger the bus controller to return an access acknowledgement message to the bus terminal in response to the access request message, wherein the access acknowledge message carries the transmission delay between the bus terminal and the bus controller; and receiving the access acknowledgement message transmitted by the bus controller in a downlink subframe, wherein the normal frame is a signal frame comprising the downlink system subframe, the downlink subframe, and the uplink subframe; or when the bus terminal is a bus terminal accessing randomly the bus controller, transmitting an access request message to the bus controller in a random access system subframe in a special frame, to trigger the bus controller to return an access acknowledgement message to the bus terminal in response to the access request message, wherein the access acknowledge message carries the transmission delay between the bus terminal and the bus controller; and receiving the access acknowledgement message transmitted by the bus controller in a downlink subframe, wherein the special frame is a signal frame comprising the downlink system subframe, the downlink subframe, the uplink subframe, and the random access system subframe.

5. The method according to claim 4, wherein triggering the bus controller to return the access acknowledgement message to the bus terminal in response to the access request message, the access acknowledge message carrying the transmission delay between the bus terminal and the bus controller comprises:
triggering the bus controller:
to obtain a reception time of the access request message, and to obtain transmission time corresponding to a specified number of OFDM symbols in the uplink subframe;
to determine the transmission time corresponding to the OFDM symbols, which is earlier than the reception time and has a minimum difference with the reception time, as a transmission time of the access request message; and
to determine the transmission delay between the bus terminal and the bus controller according to the difference between the reception time of the access request message, and the transmission time of the access request message, and to transmit the access acknowledgement message carrying the transmission delay between the bus terminal and the bus controller to the bus terminal.

6. The method according to claim 1, wherein the downlink system subframe is the first subframe in each signal frame which is a special frame or a normal frame.

7. The method according to claim 2, wherein the downlink system subframe is the first subframe in each signal frame which is a special frame or a normal frame.

8. The method according to claim 3, wherein the downlink system subframe is the first subframe in each signal frame which is a special frame or a normal frame.

9. The method according to claim 4, wherein the downlink system subframe is the first subframe in each signal frame which is a special frame or a normal frame.

10. The method according to claim 5, wherein the downlink system subframe is the first subframe in each signal frame which is a special frame or a normal frame.

11. A synchronization apparatus on the basis of a field broadband bus architecture of an industrial Internet, wherein the field broadband bus architecture of an industrial Internet comprises: a bus controller, at least one bus terminal, and a two-wire bus, and the bus controller and the at least one bus terminal are connected over the two-wire bus to constitute a bus system; the bus controller communicates with any of the at least one bus terminal, and the bus terminal communicates with each other, using the Orthogonal Frequency Division Multiplexing (OFDM) technology, and sub-carriers occupied by the bus terminal do not interfere with each other; and the synchronization apparatus applicable to each bus terminal comprises:
one or more processors; and
a memory,
wherein one or more computer readable program codes are stored in the memory, and the one or more processors are configured to execute the one or more computer readable program codes to perform:
receiving a downlink pilot signal transmitted by the bus controller in a downlink system subframe, and to determine a clock offset and a symbol offset respectively between the bus terminal and the bus controller based upon the received downlink pilot signal;
correcting a clock for a received signal based upon the clock offset, and to correct a clock for a signal to be transmitted based upon the clock offset; and adjusting a window position of the received signal based upon the symbol offset, and adjusting a window position of the signal to be transmitted based upon the symbol offset, so that the bus terminal is clock-synchronized and symbol-synchronized with the bus controller; and
adjusting a transmission time of a signal to be transmitted to the bus controller, according to a transmission delay between the bus terminal and the bus controller, and adjusting transmission time of signals to be transmitted to the other bus terminals, according to transmission delays between the bus terminal and the other bus terminals, so that the bus system is synchronized by clock-synchronization and symbol-synchronization of each bus terminal with the bus controller and adjusting the transmission delay between each bus terminal and the bus controller.

12. The apparatus according to claim 11, wherein determining the clock offset and the symbol offset respectively between the bus terminal and the bus controller based upon the received downlink pilot signal comprises:
when the bus system is being initialized, upon each reception of the downlink pilot signals in a current downlink system subframe, determining the clock offset and the symbol offset respectively between the bus terminal and the bus controller according to two downlink pilot signals received in the current downlink system subframe; or
when the bus system is operating stably, upon each reception of the downlink pilot signal in the current downlink system subframe, determining the clock offset respectively between the bus terminal and the bus controller according to a downlink pilot signal received in the current downlink system subframe, and a downlink pilot signal received in a last downlink system subframe, and every preset number of signal frames, determining the symbol offset between the bus terminal and the bus controller according to the downlink pilot signal received in the current downlink system subframe, and the downlink pilot signal received in the last downlink system subframe.

13. The apparatus according to claim 11, wherein after the bus terminal corrects the clock for the received signal based upon the clock offset, corrects the clock for the signal to be transmitted based upon the clock offset, adjusts the window position of the received signal based upon the symbol offset and adjusts the window position of the signal to be transmitted based upon the symbol offset, and before the bus terminal adjusts the transmission delay for the transmission time of the signal to be transmitted to the bus controller, according to the transmission delay between the bus terminal and the bus controller returned by the bus controller, the one or more processors are further configured to execute the one or more computer readable program codes to perform:
for the bus terminal, determining that the bus terminal is clock-synchronized successfully with the bus controller, and the bus terminal is symbol-synchronized successfully with the bus controller, upon determining that system broadcast information transmitted by the bus controller in a downlink subframe is received correctly.

14. The apparatus according to claim 13, wherein after it is determined that the bus terminal is clock-synchronized successfully with the bus controller, and the bus terminal is symbol-synchronized successfully with the bus controller, and before the bus terminal adjusts the transmission time of the signal to be transmitted to the bus controller, according to the transmission delay between the bus terminal and the bus controller, the one or more processors are further configured to execute the one or more computer readable program codes to perform:

when the bus terminal is a bus terminal initially accessing the bus controller, transmitting an access request message to the bus controller in an uplink subframe in a normal frame, to trigger the bus controller to return an access acknowledgement message to the bus terminal in response to the access request message, wherein the access acknowledge message carries the transmission delay between the bus terminal and the bus controller, and receiving the access acknowledgement message transmitted by the bus controller in a downlink subframe, wherein the normal frame is a signal frame comprising the downlink system subframe, the downlink subframe, and the uplink subframe; or when the bus terminal is a bus terminal accessing randomly the bus controller, transmitting an access request message to the bus controller in a random access system subframe in a special frame, to trigger the bus controller to return an access acknowledgement message to the bus terminal in response to the access request message, wherein the access acknowledge message carries the transmission delay between the bus terminal and the bus controller, and receiving the access acknowledgement message transmitted by the bus controller in a downlink subframe, wherein the special frame is a signal frame comprising the downlink system subframe, the downlink subframe, the uplink subframe, and the random access system subframe.

15. The apparatus according to claim 14, wherein the one or more processors configured to trigger the bus controller to return the access acknowledgement message to the bus terminal in response to the access request message, the access acknowledge message carrying the transmission delay between the bus terminal and the bus controller is further configured:

to trigger the bus controller:
to obtain a reception time of the access request message, and to obtain transmission time corresponding to a specified number of OFDM symbols in the uplink subframe;
to determine the transmission time corresponding to the OFDM symbols, which is earlier than the reception time and has a minimum difference with the reception time, as a transmission time of the access request message; and
to determine the transmission delay between the bus terminal and the bus controller according to the difference between the reception time of the access request message, and the transmission time of the access request message, and to transmit the access acknowledgement message carrying the transmission delay between the bus terminal and the bus controller to the bus terminal.

16. The apparatus according to claim 11, wherein the downlink system subframe is the first subframe in each signal frame which is a special frame or a normal frame.

17. A non-transitory computer readable storage medium on which computer instructions are stored, where the instructions are configured to be executed on a computer to cause the computer to perform the method according to claim 1.

18. The non-transitory computer readable storage medium according to claim 17, wherein determining the clock offset and the symbol offset respectively between the bus terminal and the bus controller based upon the received downlink pilot signal comprises:

when the bus system is being initialized, upon each reception of the downlink pilot signals in a current downlink system subframe, determining, by the bus terminal, the clock offset and the symbol offset respectively between the bus terminal and the bus controller according to two downlink pilot signals received in the current downlink system subframe; or when the bus system is operating stably, upon each reception of the downlink pilot signal in the current downlink system subframe, determining, by the bus terminal, the clock offset respectively between the bus terminal and the bus controller according to a downlink pilot signal received in the current downlink system subframe, and a downlink pilot signal received in a last downlink system subframe, and every preset number of signal frames, determining the symbol offset between the bus terminal and the bus controller according to the downlink pilot signal received in the current downlink system subframe, and the downlink pilot signal received in the last downlink system subframe.

19. The non-transitory computer readable storage medium according to claim 17, wherein after the bus terminal corrects the clock for the received signal based upon the clock offset, corrects the clock for the signal to be transmitted based upon the clock offset, adjusts the window position of the received signal based upon the symbol offset and adjusts the window position of the signal to be transmitted based upon the symbol offset, and before the bus terminal adjusts the transmission time of the signal to be transmitted to the bus controller, according to the transmission delay between the bus terminal and the bus controller returned by the bus controller, the method further comprises:

determining, by the bus terminal, that the bus terminal is clock-synchronized successfully with the bus controller, and the bus terminal is symbol-synchronized successfully with the bus controller, upon determining that system broadcast information transmitted by the bus controller in a downlink subframe is received correctly.

20. The non-transitory computer readable storage medium according to claim 19, wherein after it is determined that the bus terminal is clock-synchronized successfully with the bus controller, and the bus terminal is symbol-synchronized successfully with the bus controller, and before the bus terminal adjusts the transmission time of the signal to be transmitted to the bus controller, according to the transmission delay between the bus terminal and the bus controller, the method further comprises:

when the bus terminal is a bus terminal initially accessing the bus controller, transmitting an access request message to the bus controller in an uplink subframe in a normal frame, to trigger the bus controller to return an access acknowledgement message to the bus terminal in response to the access request message, wherein the access acknowledge message carries the transmission delay between the bus terminal and the bus controller; and receiving the access acknowledgement message transmitted by the bus controller in a downlink subframe, wherein the normal frame is a signal frame comprising the downlink system subframe, the downlink subframe, and the uplink subframe; or when the bus terminal is a bus terminal accessing randomly the bus controller, transmitting an access request message to the bus controller in a random access system subframe in a special frame, to trigger the bus controller to return an access acknowledgement message to the bus terminal in response to the access request message, wherein the access acknowledge message carries the transmission delay between the bus terminal and the bus controller; and receiving the access acknowledgement message transmitted by the bus controller in a downlink subframe, wherein the special frame is a signal frame comprising the downlink system subframe, the downlink subframe, the uplink subframe, and the random access system subframe.

21. The non-transitory computer readable storage medium according to claim 20, wherein triggering the bus controller to return the access acknowledgement message to the bus terminal in response to the access request message, the access acknowledge message carrying the transmission delay between the bus terminal and the bus controller comprises:

triggering the bus controller:
to obtain a reception time of the access request message, and to obtain transmission time corresponding to a specified number of OFDM symbols in the uplink subframe;
to determine the transmission time corresponding to the OFDM symbols, which is earlier than the reception time and has a minimum difference with the reception time, as a transmission time of the access request message; and
to determine the transmission delay between the bus terminal and the bus controller according to the difference between the reception time of the access request message, and the transmission time of the access request message, and to transmit the access acknowledgement message carrying the transmission delay between the bus terminal and the bus controller to the bus terminal.

22. The non-transitory computer readable storage medium according to claim 17, wherein the downlink system subframe is the first subframe in each signal frame which is a special frame or a normal frame.

* * * * *